US010929454B2

(12) United States Patent
Agrawal (10) Patent No.: US 10,929,454 B2
(45) Date of Patent: Feb. 23, 2021

(54) SYSTEM AND METHOD FOR ORGANIZING NOTES

(71) Applicant: Chad K Agrawal, Woodcliff Lake, NJ (US)

(72) Inventor: Chad K Agrawal, Woodcliff Lake, NJ (US)

( * ) Notice: Subject to any disclaimer, the term of this patent is extended or adjusted under 35 U.S.C. 154(b) by 170 days.

(21) Appl. No.: 16/002,428

(22) Filed: Jun. 7, 2018

(65) Prior Publication Data
US 2018/0285454 A1    Oct. 4, 2018

Related U.S. Application Data

(60) Provisional application No. 62/516,486, filed on Jun. 7, 2017.

(51) Int. Cl.
*G06F 16/35* (2019.01)
*G06F 16/34* (2019.01)
*G06Q 10/00* (2012.01)
*G06F 40/131* (2020.01)
*G06F 40/137* (2020.01)
*G06F 40/163* (2020.01)

(52) U.S. Cl.
CPC .......... *G06F 16/358* (2019.01); *G06F 16/345* (2019.01); *G06F 40/131* (2020.01); *G06F 40/137* (2020.01); *G06F 40/163* (2020.01); *G06Q 10/00* (2013.01)

(58) Field of Classification Search
CPC .... G06F 16/345; G06F 16/358; G06F 40/131; G06F 40/163
See application file for complete search history.

(56) References Cited

U.S. PATENT DOCUMENTS

2016/0224577 A1* 8/2016 Miller .................... G06F 11/323
2018/0032557 A1* 2/2018 Oliner .................... G06F 16/43

OTHER PUBLICATIONS

Connelly, Brian, "Working With CSVs on the Command Line", published Sep. 23, 2013, 23 pages. (Year: 2013).*
Softpedia.com, "TXTcollector", published Jun. 24, 2013, 2 pages. (Year: 2013).*
Kishore, Aseem, "How to Combine or Merge Multiple Text Files", published Aug. 28, 2015, 7 pages. (Year: 2015).*

* cited by examiner

*Primary Examiner* — Scott A. Waldron
(74) *Attorney, Agent, or Firm* — Barry Choobin; Patent 360

(57) ABSTRACT

The present invention is directed to a system and method for organizing notes. The invention includes a main list to take notes. The main list having multiple subjective headers and a note can be taken below a header subjectively related to the note. Each header is further associated with a sub-list and the notes from the main list can be moved to the sub-list based on delimiters separating the notes.

6 Claims, 11 Drawing Sheets

SYSTEM AND METHOD FOR ORGANIZING NOTES

BACKGROUND OF THE INVENTION

A. Technical Field

The present invention generally relates to an auto-note management system. More specifically, the present invention also relates to a system and method for automatically generating and managing a log note.

B. Description of Related Art

Generally, in a world where notes are used for tasks, to-do lists, thoughts, journals, diaries, content and the like, individuals have to transfer content between notes to log them in an organized fashion. Also, notes have been broadly used for a various purpose in communicating ideas and information. For example, during a discussion, a brainstorming session, participants write down ideas on a note pad, i-pad, laptop, and mobile devices. In addition, people commonly use notes throughout the day to memorialize information or content which the individual does not want to forget such that they will save as a check list. As additional examples, people frequently use notes as reminders of actions or events to take in the future, such as to make a mobile call, revise a document or to fill out a time sheet etc.

Electronic devices are provided with input devices for users to control note functions thereof. For example, a mobile phone is equipped with a touch-sensitive device for users to input required operations. Users can input their information in a separate application such as work task, ideas, journal content etc. For example, users can activate a note application, and make notes by providing information. Each input information is stored in the different application and users need to log in separately to each application for accessing it.

Using the note application in the mobile device or in a laptop or any other device, users can generate notes at will. Currently, the notes are generated as files and stored in the corresponding application. Generally, it is hard for users to manage the notes when a large number of notes are simultaneously created and stored in a different place. For example, when a review of a specific note is needed, it may be hard to locate the specific note in the application. Past systems are limited to generating, editing and labeling notes. The only way to log notes is by transferring content manually. Older systems require unnecessary steps by individuals, resulting in wasted time and effort.

In the light of above-mentioned problems, there is a need for an auto-note management system that permit users to easily and efficiently generate and manage log notes.

SUMMARY OF THE INVENTION

The present invention discloses an auto-note management system, for instance, the system and method for managing or combining the notes into a log note. A method and system for automatically logging a note is disclosed. The auto log management system comprises an electronic device having a memory unit and a processing unit for generating one or more electronic notes. Receiving at least one user input via a display module of the electronic device, importing one or more electronic notes stored in the memory unit of the electronic device. Determining at the processing unit, via a delimiter, identify one or more headers and one or more single empty lines in one or more electronic notes. Obtaining a content via one or more empty lines and one or more headers. Adding the content to a log note matching one or more headers and removing a logged content from one or more electronic notes. Exporting a remaining one or more electronic notes and displaying at least one auto log note from the electronic notes.

In one embodiment the auto-note management system comprises an electronic device, a network and a server. The electronic device could by any computing device that is capable of receiving input from a user and displaying information about notes. In the illustrated embodiment, the electronic device includes a memory unit, a processing unit, and a task list generator to generate one or more electronic note.

In one embodiment the method/process of auto-management in an embodiment of the present invention. Providing an electronic device comprising a memory unit and a processing unit connected to the memory unit. Generating one or more electronic notes in a plurality of configurations for associating with one or more contexts and application items. At another step, receiving at least one user input via a display module of the electronic device. At another step, importing one or more electronic notes of the one or more context and application items stored in the memory unit of the electronic device. At another step, determining at the processing unit, via a delimiter, identify one or more headers and one or more single empty lines in one or more electronic notes. At another step, obtain the content between one or more empty lines. At another step, if one or more single empty lines are not identified, logging is not required. At another step, if one or more single empty lines are identified obtaining a content via one or more empty lines and one or more headers. At another step, adding the content to a log note matching one or more headers and removing a logged content from one or more electronic notes. At another step, exporting a remaining one or more electronic notes from the plurality of configurations for associating with different contexts and application items. Displaying at the processing unit, via a display module, at least one auto-log note from the electronic notes.

The electronic device of the auto note management system could include any devices such as a PDA (personal digital assistant), a smart phone, a mobile phone, a MID (Mobile Internet Device), a tablet, a desktop computer, a laptop computer, a car computer, a digital camera, a multimedia player, a game device or any other type of computational device, not limited thereto. The processing unit may include any machine, electronic, magnetic, optical, electrochemical, or other high-speed data processing device performing a logical, arithmetic or storage function, and may include, but not be limited to, both a computer central processing unit. The electronic note is configured to generate notes items based on user inputs.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
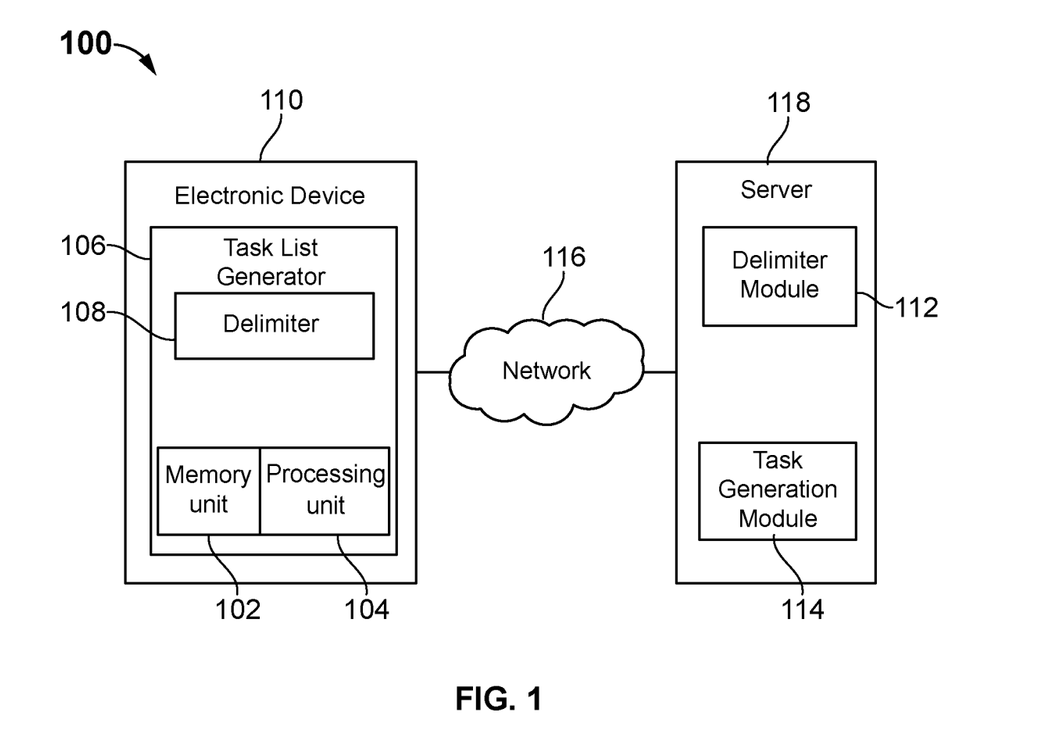
FIG. 1 is a block diagram that illustrates an exemplary system for an auto-note management, according to an embodiment of the present invention.

The present invention discloses a system and method for automatically logging a note. The auto-note management system 100 comprises an electronic device 110, a network 116 and a server 118. The electronic device 110 could be any computing device that is capable of receiving input from a user and displaying information about notes. In the illustrated embodiment, the electronic device 110 includes a memory unit 102, a processing unit 104, and a task list generator 106 to generate one or more electronic note. The electronic device 110 could include any devices such as a PDA (personal digital assistant), a smart phone, a mobile phone, a MID (Mobile Internet Device), a tablet, a desktop computer, a laptop computer, a car computer, a digital camera, a multi-media player, a game device or any other type of computational device, not limited thereto. The processing unit 104 may include any machine, electronic, magnetic, optical, electrochemical, or other high-speed data processing device performing a logical, arithmetic or storage function, and may include, but not be limited to, both a computer central processing unit. The electronic note is configured to generate notes items based on user inputs. The auto-note management system 100 combines and automates the notes from the task list generator. The electronic device 110 could include plurality of configurations for associating with one or more contexts and application item. The server 118 is illustrative of a general purpose or other computing device operating as a remote server on which the functionality of the auto-note management system 100 as described herein. The server 118 comprises a delimiter module 112 and a task generation module 114. In some embodiments, all functionality and data storage associated with the auto-note management system 100 having sufficient computer-executable instructions for performing the functions described herein. The functionality and associated data for the auto-note management system 100 could be maintained and operated at the server 118. In one embodiment, the server 118 could host multiple modules for auto-note management system 100.

The electronic device 110 include a variety of physical input units (such as a keyboard, a mouse, a touchpad, or a touch screen). Any of these user interface units may be implemented as an external unit that communicates with the electronic device 110 to provide user input using a wired or wireless communication technology. Through these user interface units, the electronic device 110 could receive physical or voice inputs from the user.

Figure 2:
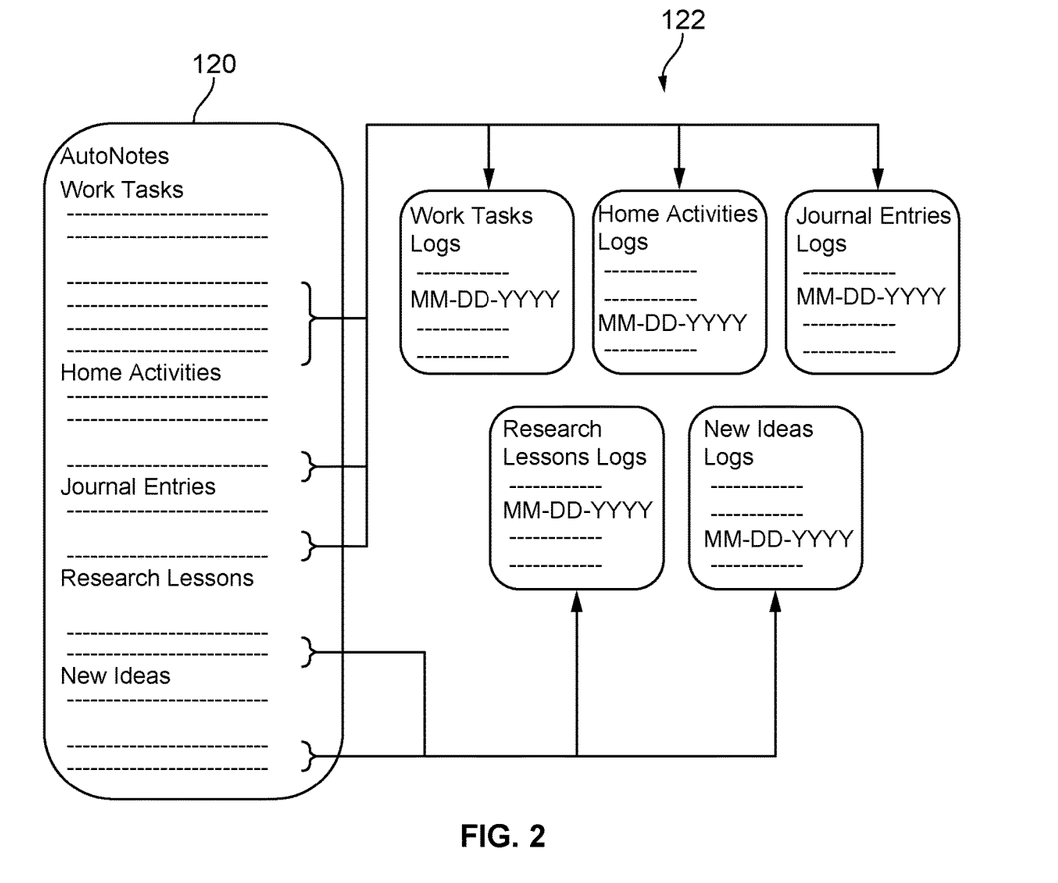
FIG. 2 is a screenshot of one or more electronic notes in an embodiment of the present invention.

FIG. 2 is a screenshot of one or more electronic notes in an embodiment of the present invention. In one embodiment, the processing unit 104 uses headers to determine whether any auto log notes 120 are associated with a particular information or data type. The one or more electronic notes are logged with date automatically with headers for each note separately. User could create a process executed by the electronic device 110 or server 118 to complete the requisite tasks and provide the user with notes logging automation.

In one embodiment the user inputs a note into the electronic device 110. Under any headers in the task list generator 106 electronic note, the user adds one or more empty lines above any content to be logged. One or more empty lines can be inputted in any way, including but not limited to, pressing enter on a keyboard (once on a double-spaced note or twice on a single-spaced note). Either on command or at a scheduled time, the processing unit 104 automatically logs the appropriate content to other notes (as described above).

Figure 3:
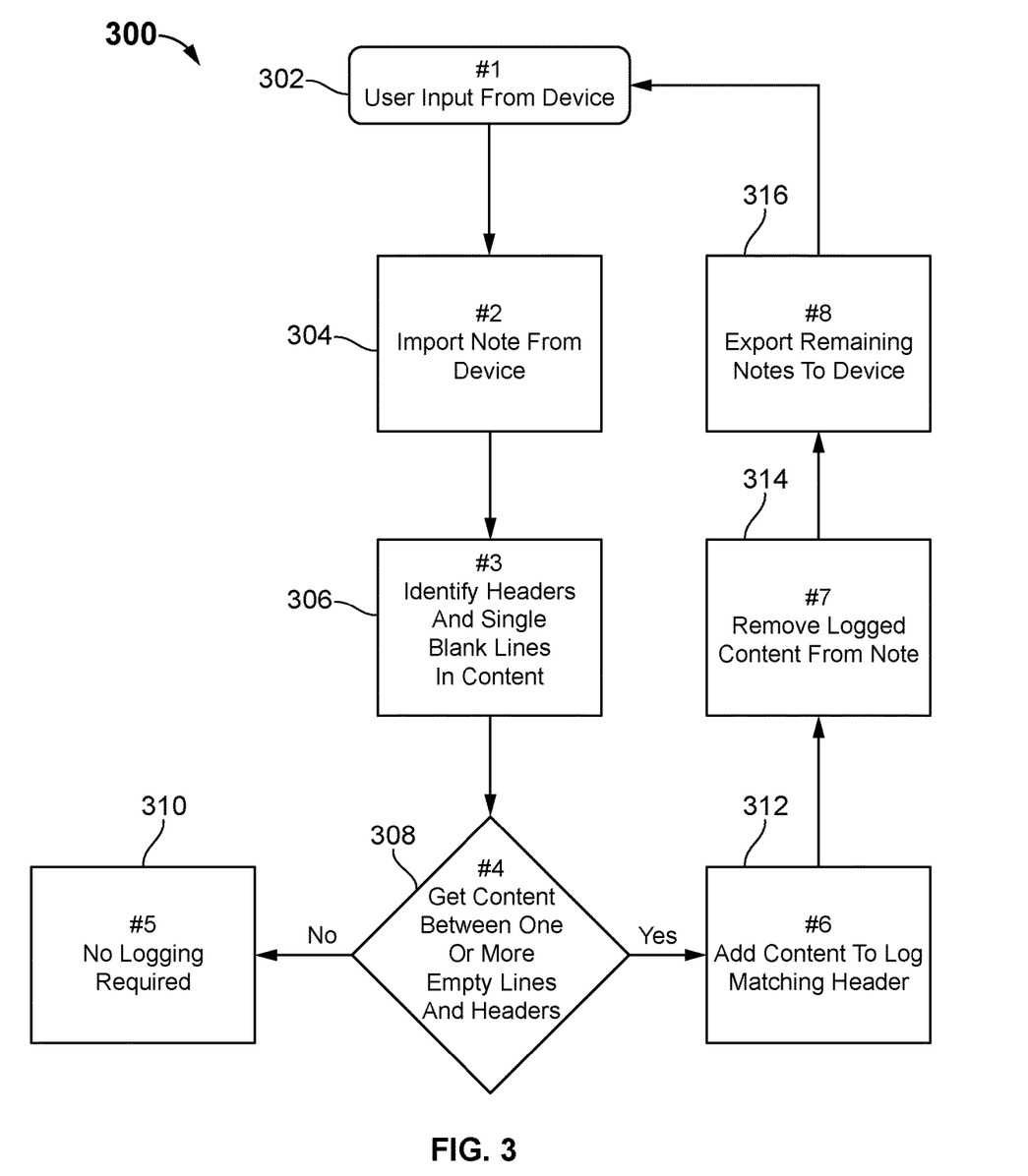
FIG. 3 is a flowchart illustrating the method/process of auto-note management system in an embodiment of the present invention.

FIG. 3 is a flowchart illustrating the method/process 300 of auto-note management, incorporated in system 100 (as shown in FIG. 1 and FIG. 2), in an embodiment of the present invention. The method 300 includes, providing an electronic device 110 comprising a memory unit 102 and a processing unit 104 connected to the memory unit 102. Further, the method 300 further generates one or more electronic notes in a plurality of configurations for associating with one or more contexts and application items. At step 302, the method 300 further receives at least one user input via a display module of the electronic device. At step 304, the method 300 further imports one or more electronic notes of the context and application items stored in the memory unit 102 of the electronic device 110.

At step 306, the method 300 further determines or identifies at the processing unit, via a delimiter 108, one or more headers and one or more single empty lines in one or more electronic notes. At step 308, the method 300 further obtains the content between one or more empty lines. At step 310, if one or more single empty lines are not identified, logging is not required. At step 312, if one or more single empty lines are identified, the method 300 further includes, obtaining a content via one or more empty lines and one or more headers. At step 314, the method 300 further includes, adding the content to a log note matching one or more headers and removing a logged content from one or more electronic notes. At step 316, the method 300 further includes, exporting remaining one or more electronic notes from the plurality of configurations for associating with different contexts and application items. The method 300 further displays at the processing unit, via a display module, at least one auto-log note 120 from the electronic notes.

Figure 4:
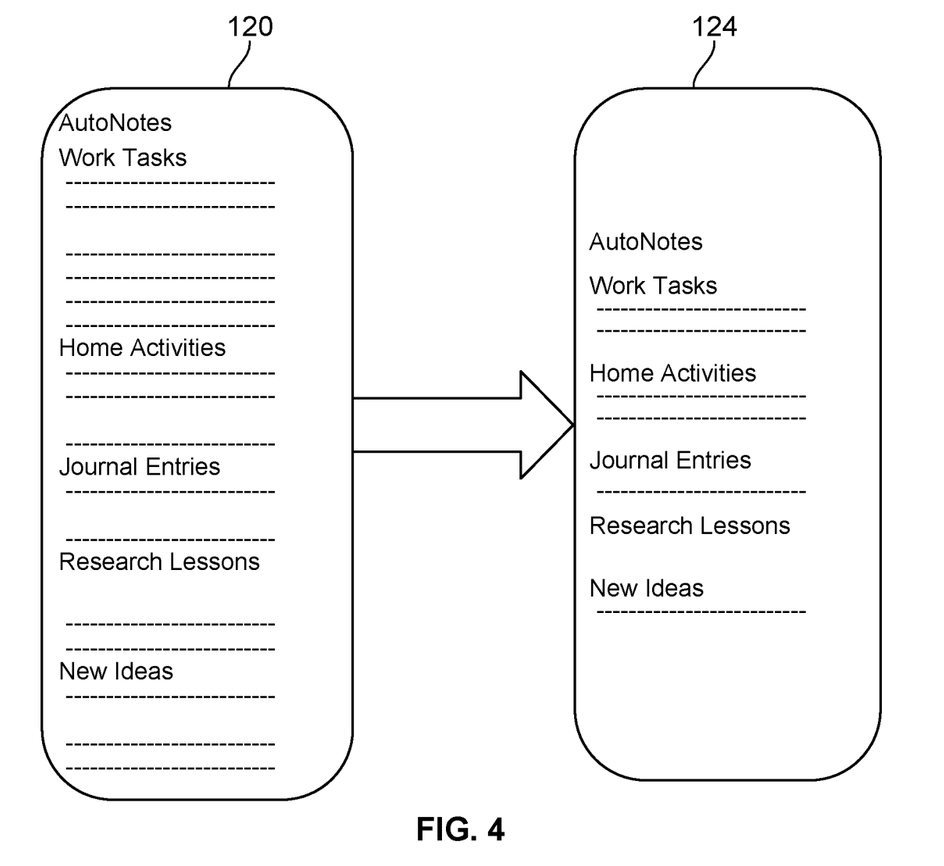
FIG. 4 is a screenshot of timeline for the auto-note management in an embodiment of the present invention.

FIG. 4 is a screenshot of timeline for the auto-note management 100 in an embodiment of the present invention. Each auto log notes 120 of the one or more electronic notes are separated by the header during auto-logging. An empty line is inserted between the electronic notes. The electronic notes above the empty lines remains in an auto log note. The electronic notes below the empty lines are logged out from the auto log note. The auto-note management system 100 logs into the electronic note and add dates to log notes automatically. After logging, the user interface displays a timeline auto-note 124 with separate headers.

Figure 5:
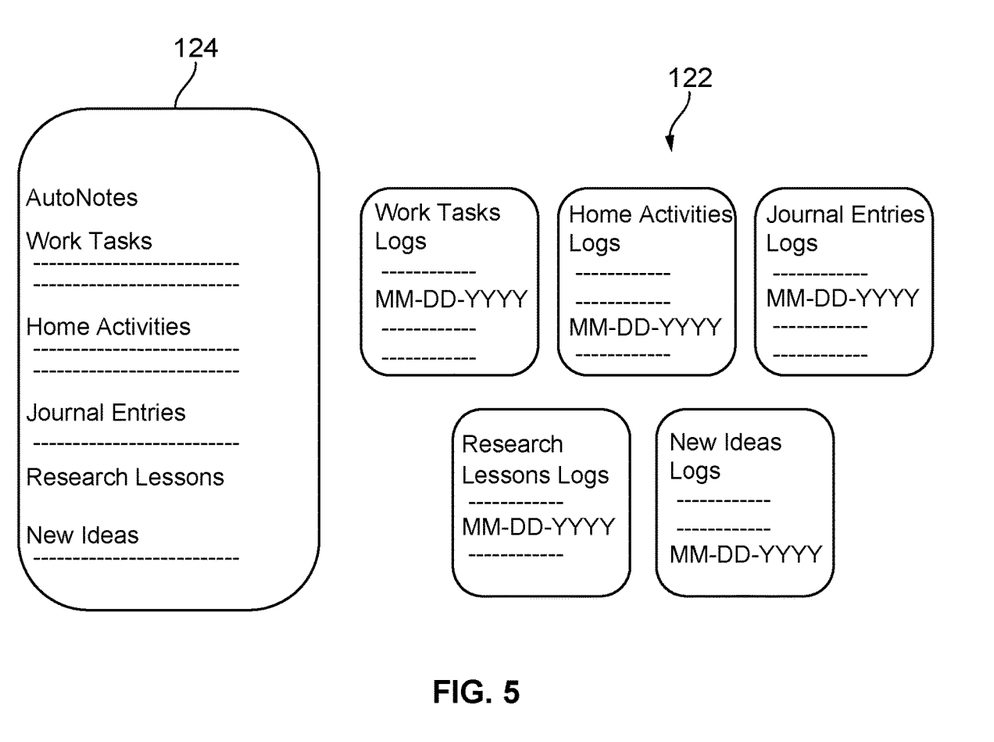
FIG. 5 is a screenshot of automatically adding dates to an auto log note in an embodiment of the present invention.

FIG. 5 is a screenshot of automatically adding dates to an auto log note in an embodiment of the present invention. The timeline auto-note 124 with separate headers are identified by the auto-note management system 100. Automatically dates are added for each one of the electronic notes 122 generated by the task list generator 106.

Figure 6:
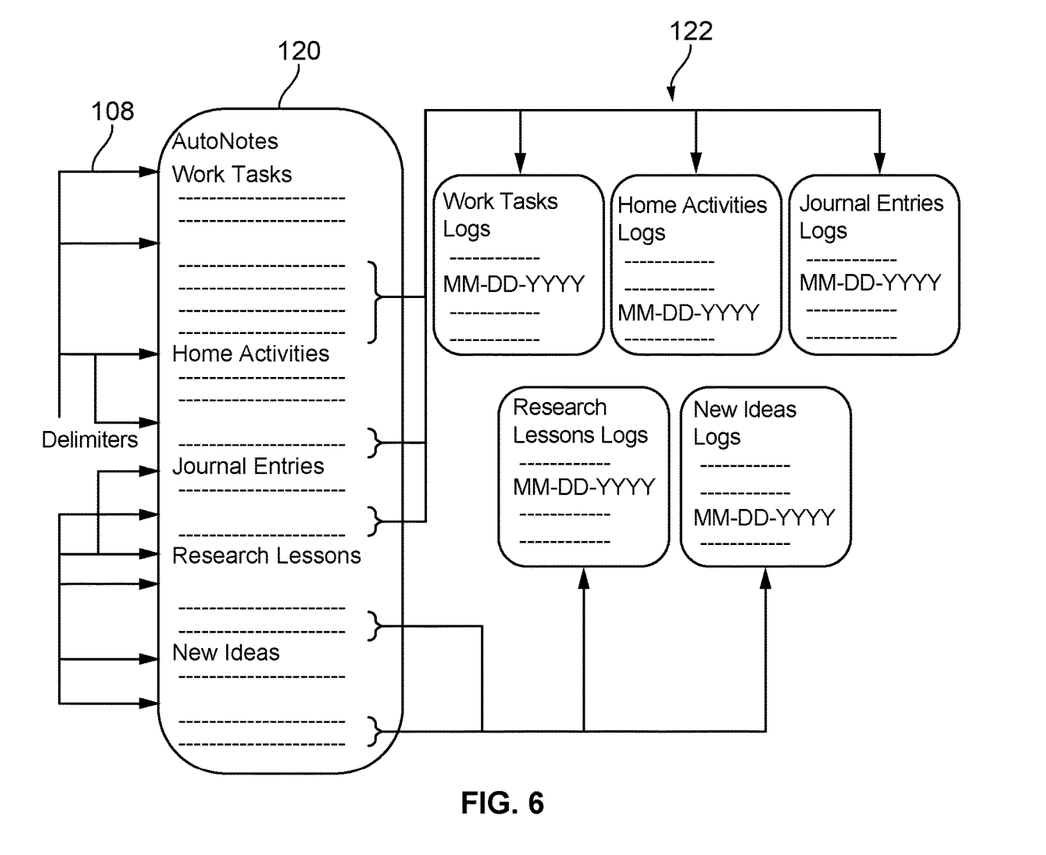
FIG. 6 is a screenshot of adding delimiter for the auto-note management in an embodiment of the present invention.

FIG. 6 is a screenshot of adding delimiter for the auto-note management in an embodiment of the present invention. In one embodiment the electronic device 110 also include a delimiter 108. The delimiting characters includes one or more characters, but not limited to, an empty or blank line (' '), a new line or end of line (CR LF, CR, LF, \n, \r\n), a symbol/character such as a space (' '), an asterisk ('*'), a pound sign ('#'), a greater-than sign ('>'), a less-than sign ('<'), an equal sign ('='), a parenthesis ('('or')'), a dash ('-'), a slash ('/'), a backslash ('\'), a colon (':'), a semi-colon (';'), a period ('.'), or the like. The task list generator 106 electronic note is selected from a group comprising of a work task, a home activity, a journal entity, a new idea and a research lesson.

Figure 7:
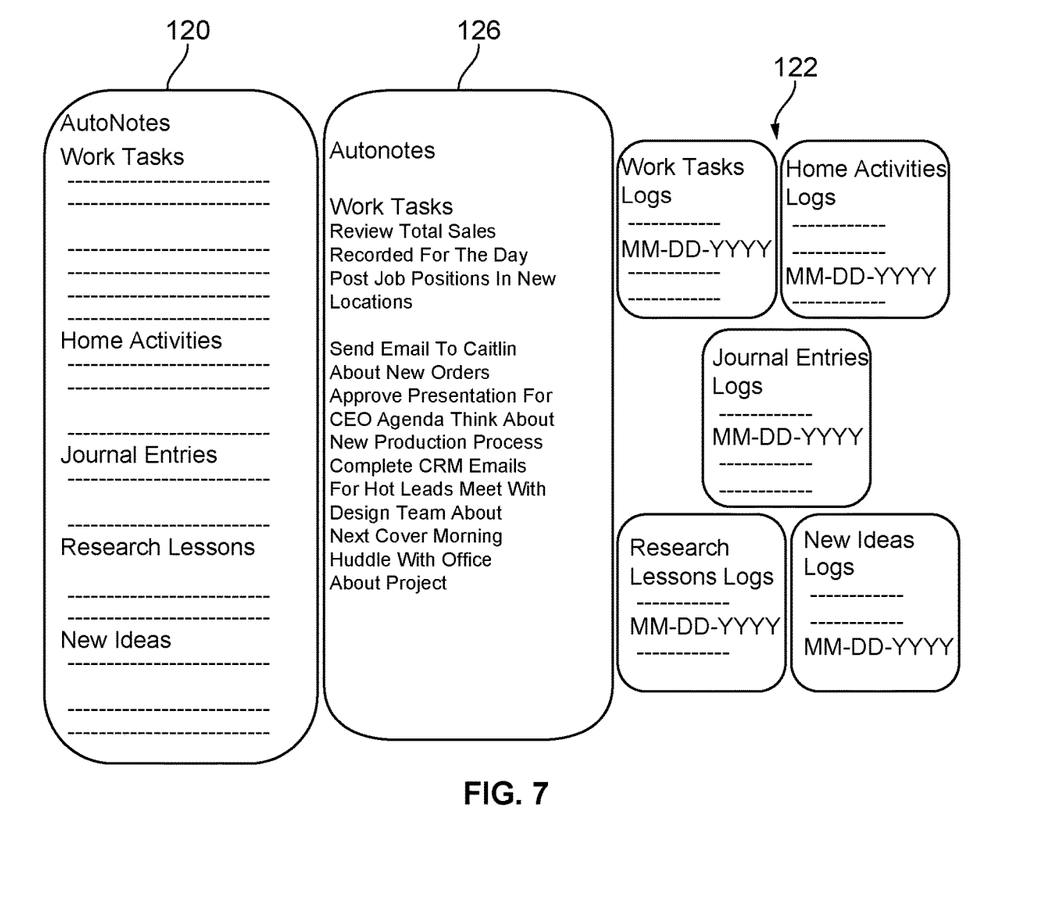
FIG. 7 is a screenshot of viewing the auto log note in an embodiment of the present invention.

FIG. 7 is a screenshot of viewing the auto log note in an embodiment of the present invention. When a user logs on to one or more electronic note, auto log notes 120 process the one or more electronic note into two types a) an updated log note and b) a logged note. The auto-note may combine and automate the one or more electronic note 126 as the updated log note. The logged notes are automated with date or timestamp for review of the user. The auto log notes 120 merges the one or more electronic note 126 into a date added electronic note 122.

Figure 8:
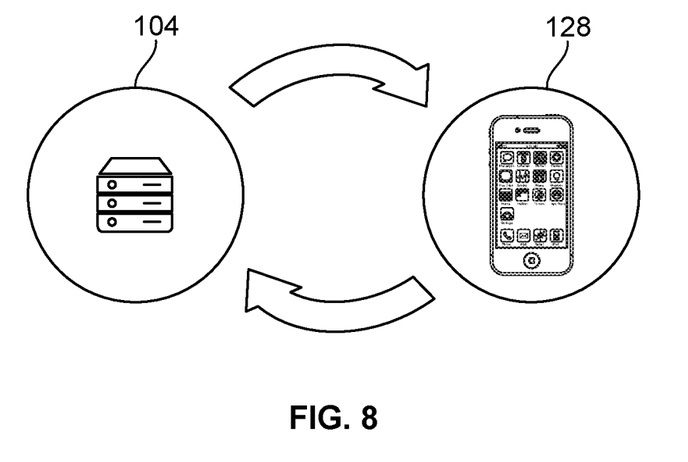
FIG. 8 illustrates a process between a processing unit and a user interface of the electronic device in an embodiment of the present invention.

FIG. 8 illustrates a process between a processing unit and a user interface of the electronic device in an embodiment of the present invention. The processing unit 104 could be implemented using hardware or a combination of hardware and software/firmware instructions. The processing unit 104 navigates, transfer and log note and performs various actions on the electronic notes 122. The user is notified with priority task, activities and entries based on the date or timestamp, and user may view the pending and completed notes in a display module 128 of the electronic device 110. At the same time, user could view in the display module 128 past notes by date, already logged task, activities and entries.

Figure 9:
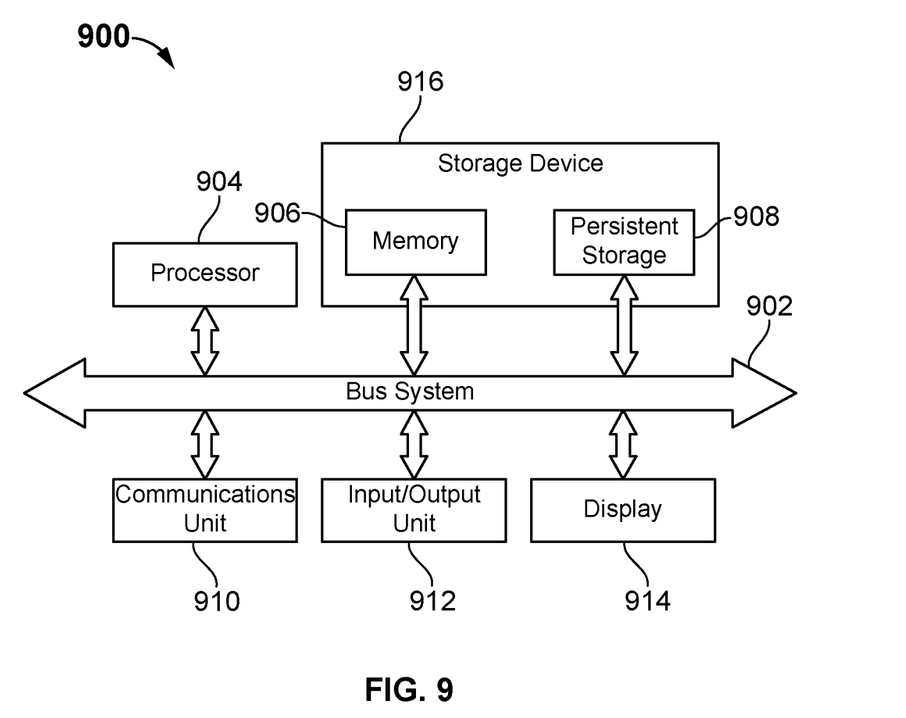
FIG. 9 illustrates an exemplary device incorporated in the system of FIG. 1 according to an embodiment of the present invention.

FIG. 9 illustrates an exemplary device incorporated in the system of FIG. 1, according to an embodiment of this disclosure. The device 900 represents either the electronic device 110 or the server 118 in FIG. 1. In an embodiment, the device 900 includes a bus system 902. The bus system 402 supports communication between a processor 904, a memory 906, a persistent storage 908, a communications unit 910, an input/output (I/O) unit 912, and a display or display interface 914. Any suitable bus or buses could be used here.

The processor 904 processes software instructions loaded into the memory 906. The processor 904 may include a single processor, multiple processors, one or more multi-processor cores, or other type of processor depending on the particular implementation. As an example, the processor 904 may be implemented using a number of heterogeneous processor systems in which a main processor is present with secondary processors on a single chip. As another example, the processor 904 may be a symmetric multi-processor system containing multiple processors of the same type. Any suitable processing device(s) could be used.

The memory 906 and the persistent storage 908 are examples of storage devices 916. A storage device is any piece of hardware capable of storing information, such as data, program code, and/or other suitable information on a temporary or permanent basis. The memory 906 may be a random-access memory or other volatile or non-volatile storage device(s). The persistent storage 908 may contain one or more components or devices, such as a hard drive, flash memory, optical disc, or other persistent storage device (s). A storage device may be fixed or removable, such as when a removable hard drive or USB thumb drive is used.

The communications unit 910 provides for communications with other systems or devices. For example, the communications unit 910 could include a network interface card or a wireless transceiver. The communications unit 910 may provide communications through physical or wireless communications links.

The I/O unit 912 allows for input and output of data using other components connected to or integrated within the device 900. For example, the I/O unit 912 may provide a connection for user input through a keyboard, mouse, or other input device. If the device 500 includes a display 914, the display 914 provides a mechanism to visually present information to a user. The display 914 could represent a touchscreen.

In one embodiment, program code for an operating system, applications, or other programs may be located in the storage devices 916, which are in communication with the processing device 904 through the bus system 902. Instructions forming the programs may be loaded into the memory unit 906 for processing by the processing unit 904.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Figure 10:
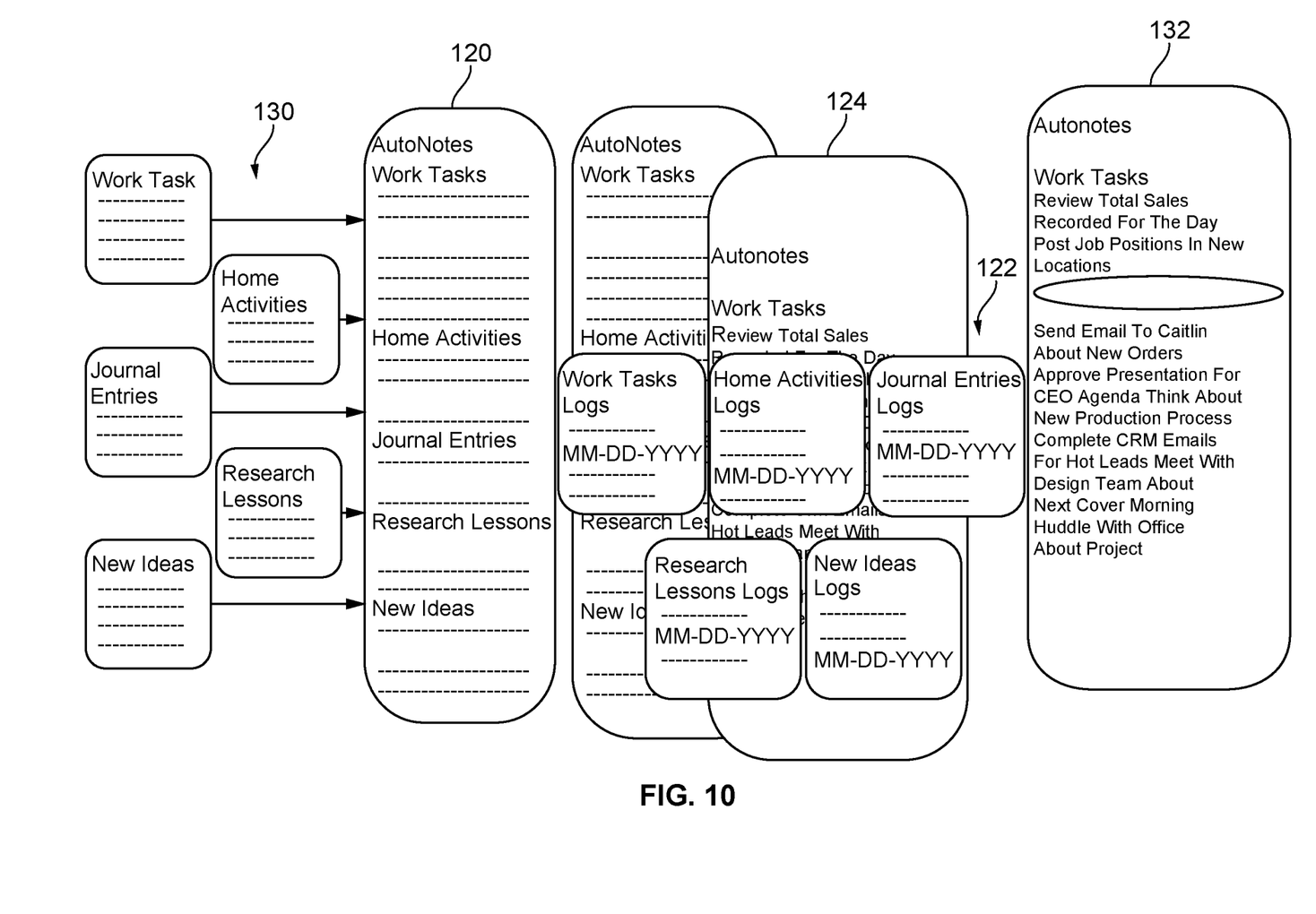
FIG. 10 is a screenshot of the auto log note in an embodiment of the present invention.

FIG. 10 is a screenshot of the auto log note in an embodiment of the present invention. In one embodiment that auto-note management system 100 may be implemented on the electronic device 110 or in the server 118 based on input received at the electronic device 110. Although not depicted in FIG. 1, the one or more electronic note 130 may be stored on the electronic device 110 or in the server 118 or may be synchronized to both. If one or more electronic note 130 are stored in the server 118, the auto-note management system 100 may retrieve the auto log note 120 in response to, for example, input from a user. The processing unit automatically logs and displays the timeline auto-note 124 to the user. Empty lines and headers are used as delimiters 108 to log one or more electronic note 130. The processing unit transfers one or more electronic notes to the processing unit 104 for further processing.

In one embodiment, the user may select or create a new electronic note 130. For example, the user may enter least one work task, the journal entity, the research lesson, the new idea and the home activity 122. As the user types, the delimiter 108 identify single empty lines from the electronic notes dynamically. For example, as the user types the tasks into the interface of the electronic device 110 and the auto management system process and displays final auto log note 132 to the user interface.

In one embodiment, user updates in real time are modified and logged in the auto log note 120 associated with the electronic notes. The processing unit 104 checks if there are one or more single empty or blank lines. If one or more consecutive empty lines are identified by the delimiter 108, the processing unit 104 decides whether or not to log the note. If the user has included one or more consecutive empty (or blank) lines, then content will be logged to a matching or corresponding note.

Figure 11:
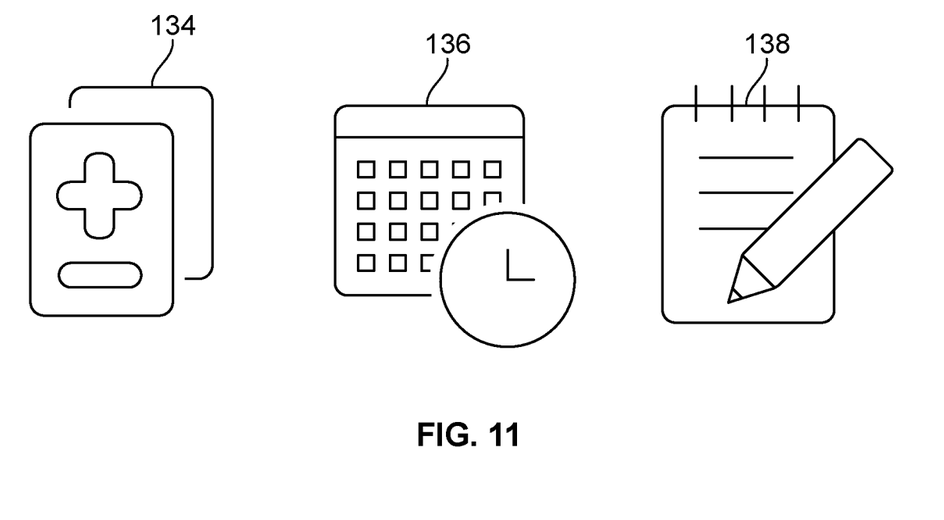
FIG. 11 illustrates an upgrading mechanism of the auto log note in an embodiment of the present invention.

FIG. 11 illustrates an upgrading mechanism of the auto log note in an embodiment of the present invention. In some embodiments, the auto log notes 120 could be synchronized with calendar application or any related applications. The auto log notes 120 could be modified/customized to include the gamification features, custom workflows, auto reminders, scheduled notes, migrated notes, social sharing, social following, social feeds and recurring notes. The auto log notes 120 could have more or less logging notes. The auto log notes 120 have scheduled notes that are transferred and notified to the user and user could modify the title or header of the auto log notes 120. The user could access an updated note with all the desired content automatically logged to other notes. The auto log notes 120 enable the user with a better note taking experience. Also, the user can access the transferred content in other notes where it has been automatically logged, saving the user time and effort require for manual logging.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A method comprising the steps of:
providing an electronic device with an interface for receiving notes and delimiters from a user, the electronic device comprising a memory unit and a processing unit connected to the memory unit;
receiving, by the electronic device, through the interface, a first note and a second note, the first note and the second note are consecutive, the second note after the first note;
associating, by the electronic device, the first note and the second note to a header;
creating, by the electronic device, a sub-list associated with the header;
receiving, by the electronic device, through the interface, a delimiter before the second note;
identify, by the electronic device, the delimiter;
upon identification of the delimiter, selectively moving at a predetermined time, by the electronic device, based on the delimiter, the second note to the sub-list;
associating, by the electronic device, the first note with a predetermined function;
receiving, by the electronic device, a third note associated to the header, the third note arranged consecutively after the first note; and
presenting, by the electronic device, the first note and the third note.

2. The method of claim 1, further comprises date and time stamping, by the electronic device, of the first note, the second note, and the third note.

3. The method of claim 1, wherein the delimiter is selected from a group consisting of a line break, a symbol, a slash, a backslash, a colon, a semi-colon, or a period.

4. A non-transitory computer readable storage medium comprising instructions that, when executed by at least one processing device, cause the at least one processing device to:
provide an interface for receiving notes and delimiters from a user;
receive, through the interface, a first note and a second note, the first note and the second note are consecutive, the second note after the first note;
associate the first note and the second note to a header;
create a sub-list associated with the header;
receive, through the interface, a pair of consecutive delimiters before the second note;
identify the pair of consecutive delimiters; and
upon identification of the pair of consecutive delimiters, selectively move at a predetermined time, the second note based on the delimiter, to the sub-list;
receive, through the interface, a third note associated with the header, the third note consecutively arranged after the first note; and
present the first note and the third note.

5. The non-transitory computer readable storage medium of claim 4, wherein the processor:
add date and time stamp to the first note, the second note, and the third note.

6. The non-transitory computer readable storage medium of claim 4, wherein the pair of consecutive delimiters is selected from a group consisting of two line breaks, two symbols, two slashes, two backslashes, two colons, two semi-colons, or two periods.

* * * * *